United States Patent [19]
Chang

[11] Patent Number: 5,664,445
[45] Date of Patent: Sep. 9, 1997

[54] PRY-PROOF LOCK

[75] Inventor: Chin-Shu Chang, Changhua, Taiwan

[73] Assignee: Handyway Co., Ltd., Chang-hua, Taiwan

[21] Appl. No.: 705,048

[22] Filed: Aug. 29, 1996

[51] Int. Cl.$^6$ .................................................. E05B 67/36
[52] U.S. Cl. ............................ 70/34; 70/386; 70/422
[58] Field of Search ................................ 70/33, 34, 39, 70/231, 422, 386; 292/252

[56]                References Cited

U.S. PATENT DOCUMENTS

| | | | |
|---|---|---|---|
| 1,607,758 | 11/1926 | Junkunc | 70/386 |
| 1,692,826 | 11/1928 | Ganz | 70/386 |
| 3,525,242 | 8/1970 | Young | 70/34 |
| 4,152,909 | 5/1979 | Lundberg | 70/34 |
| 4,236,395 | 12/1980 | Avaiusini | 70/34 |
| 4,339,853 | 7/1982 | Lipschitz | 292/252 X |
| 4,576,021 | 3/1986 | Holden | 70/34 |
| 4,637,234 | 1/1987 | Mielonen | 70/34 |
| 4,709,567 | 12/1987 | Appelbaum | 70/455 |
| 5,197,314 | 3/1993 | Stillwagon et al. | 70/34 X |

Primary Examiner—Lloyd A. Gall

[57]                 ABSTRACT

An improved lock guarded from being sabotaged by prying or cutting has a round latch rod and a lock assembly that are separably locked together by way of retaining balls housed and limited in holes in a rotary unit which is spring biased so as to retractably move back and forth in a sleeve. A limiting stopper having a flanged end which is provided with a pair of opposite cuts in correspondence to the retaining balls. The retaining balls are in general limited by the flanged end without being movable up and down so that a latch rod having a groove in which the retaining balls can be housed is locked in place once the latch head is forced into engagement with the retaining balls. The retaining balls can only be freed as long as the cuts of the flanged end of the limiting stopper are put in alignment with the retaining balls either by pushing the latch rod against the spring biased rotary unit, causing the rotary unit to separate from the retaining unit, or by spinning the rotary unit with a key to get the retaining balls aligned with the cuts of the retaining unit. The latch rod can only be released by a key which rotates the rotary unit into alignment with the cuts of the retaining unit so that the retaining balls housed in a groove of the latach head are movable up and down.

4 Claims, 8 Drawing Sheets

PRY-PROOF LOCK

BACKGROUND OF THE INVENTION

The present invention relates to an improved lock and more particularly to a lock which is equipped with a rotatable latch rod so as to make it free from being sabotaged by prying or cutting by a saw.

Locks of varieties have been developed for commercial purpose and widely applied by people to doors, windows, cars, motorcycles and etc. to guard their private properties against burglars or robbers. However, common locks are easily sabotaged by thieves or burglars with a prying tool.

To protect a lock from being sabotaged by a prying tool or a cutting saw, the present inventor comes up with an improved pry-proof lock which has a randomly rotatable latch rod as long as external force is exerted thereto so that a point of application of force is not easily located on the latch rod as a burglar tries to pry the lock apart.

SUMMARY OF THE INVENTION

Therefore, the primary object of the present invention is to provide an improved lock which can be guarded from being sabotaged by prying tools or cutting saws.

Another object of the present invention is to provide an improved lock which has a randomly rotatable latch rod engaged with a lock body of the present invention so that a point of application of force is hardly located when a burglar is trying to sabotage a lock of the present invention by a prying tool or a cutting saw.

DETAILED DESCRIPTION OF THE PREFERRED EMBODIMENTS

Figure 1:
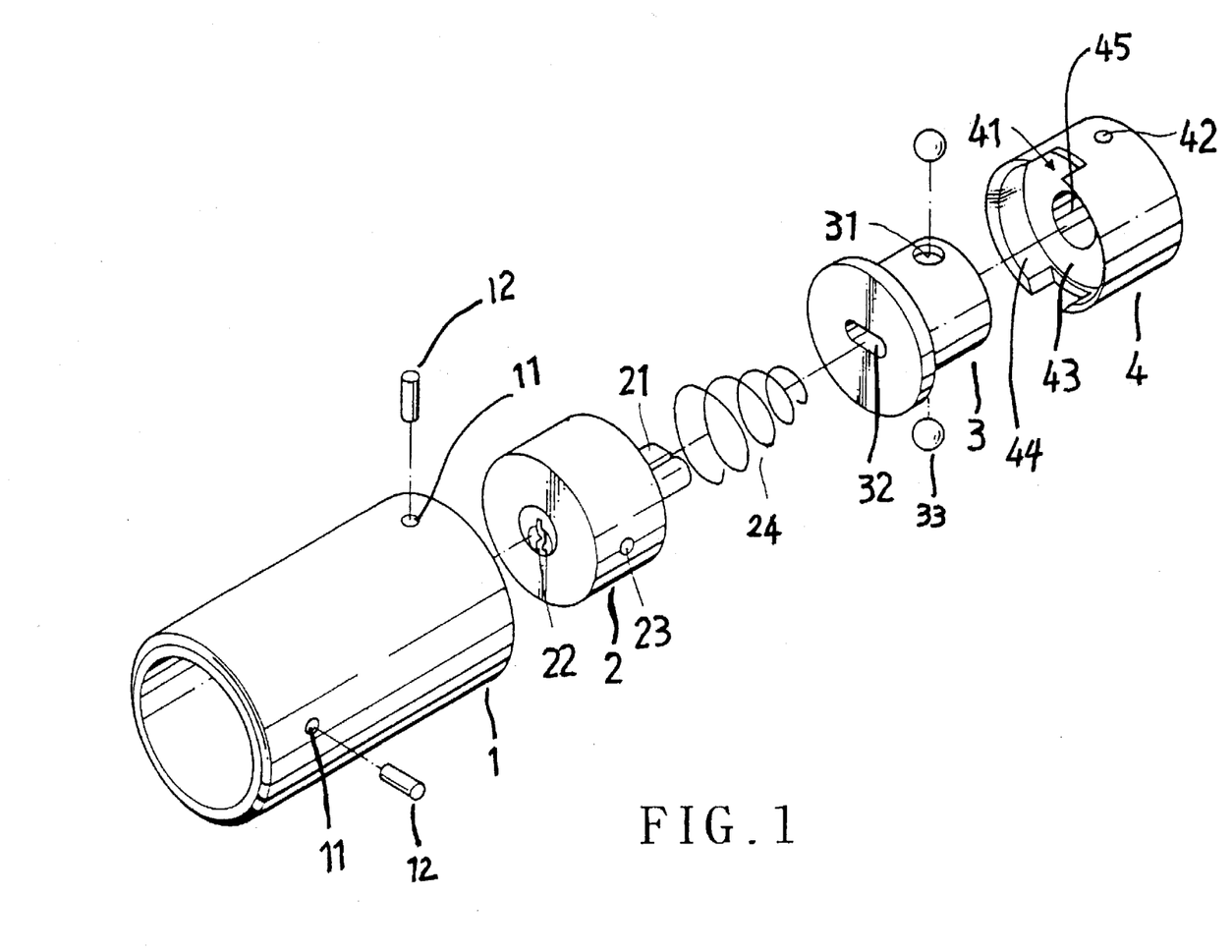
FIG. 1 is a perspective diagram showing the exploded components of the present invention.

Referring to FIG. 1, the improved lock of the present invention is mainly equipped with a sleeve 1, a lock body 2, a rotary unit 3, a retaining unit 4, a spring 24 and pins 12 and etc.

The sleeve 1 is a hollow tube in which the lock body 2, spring 24, rotary unit 3 and retaining unit 4 are housed in order. There are a number of through holes 11 disposed on the sleeve 1 for the insertion of pins 12.

The lock body 2 has a key hole 22 disposed at one end and a projected block 21 at the opposite end thereof. About the projected block 21 is disposed the spring 24. The projected block 21 is inserted into an oval hole 32 defined on the rotary unit 3. On the lock body 2 is disposed a hole 23 located in alignment with one of the through holes 11 on the sleeve 1 so that the pin 12 can be inserted for fixing purpose.

The rotary unit 3 is in a tubular form having the oval hole 32 disposed at one end and a retaining hole 31 is placed on the periphery for receiving a retaining ball 33. The rotary unit 3 is placed inside of the retaining unit 4.

The retaining unit 4 has a hollow interior and has a pair of oppositely disposed cuts 41 on the front skirt thereof. A support plate 43 having a through hole 45 is disposed inside the retaining unit 4 adjacent the front skirt 44. A through hole 42 is disposed on the external wall of the retaining unit 4 in alignment with the through hole 11 on the sleeve 1 so that the pin 12 can be inserted to lock the sleeve 1 and the retaining unit 4 in position.

Figure 2:
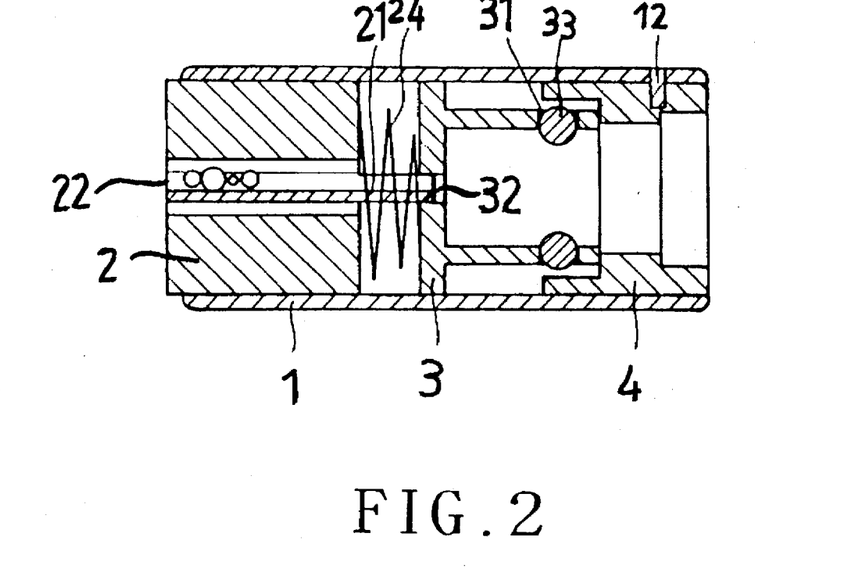
FIG. 2 is a sectional diagram showing the inner structure of the present invention.

Referring to FIG. 2, the sectional diagram of the present invention is shown. In assembly, the lock body 2, the spring 24, the rotary unit 3, retaining balls 33 and the retaining unit 4 are placed in the sleeve 1 one by one in that order. The projected block 21 of the lock body 2 surrounded by a spring 24 is inserted into the oval hole 32 of the rotary unit 3. The retaining balls 33 placed in the holes 31 of the rotary unit 3 respectively are round so that they will partially protrude out of the holes 31 and will not totally fall thereinto. Besides, the rotary unit 3 is partially placed inside the retaining unit 4 and the retaining balls 33 are restrained by front skirt 44 of the retaining unit 4, having no room for shifting linearly, as long as they are not shifted into alignment with the paired cuts 41 of the retaining unit 4. The rotary unit 3 is limited at the rear end thereof by the support plate 43 of the retaining unit 4 and is further retrained by the pin 12 led through the hole 11 of the sleeve 1 and the hole 23 of the lock body 2 and another pin 12 led through the hole 42 of the retaining unit 4 to fix in the sleeve 1.

Figure 3:
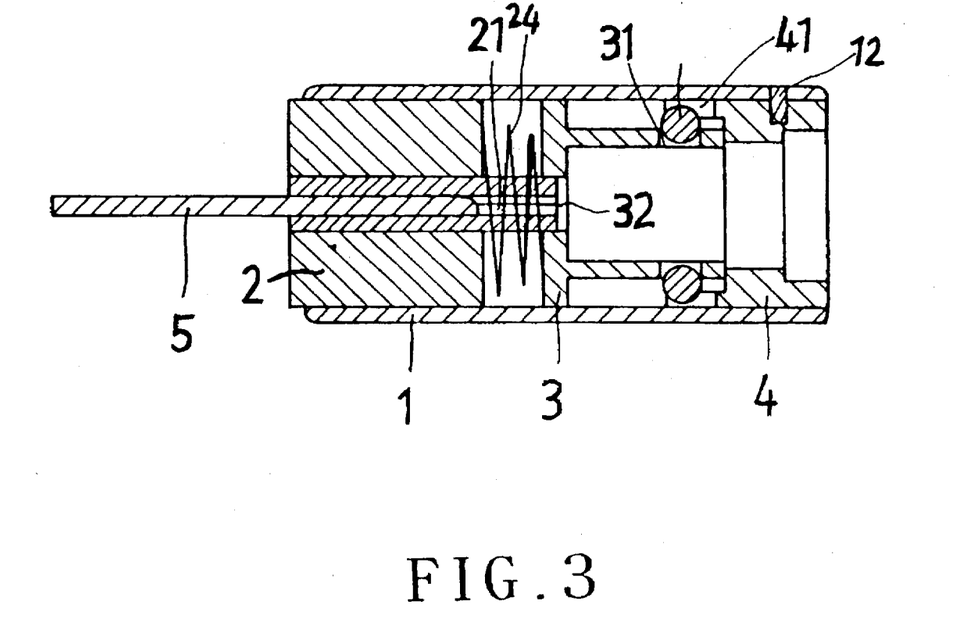
FIG. 3 is a sectional diagram showing a key inserted into the lock of the present invention.
Figure 4:
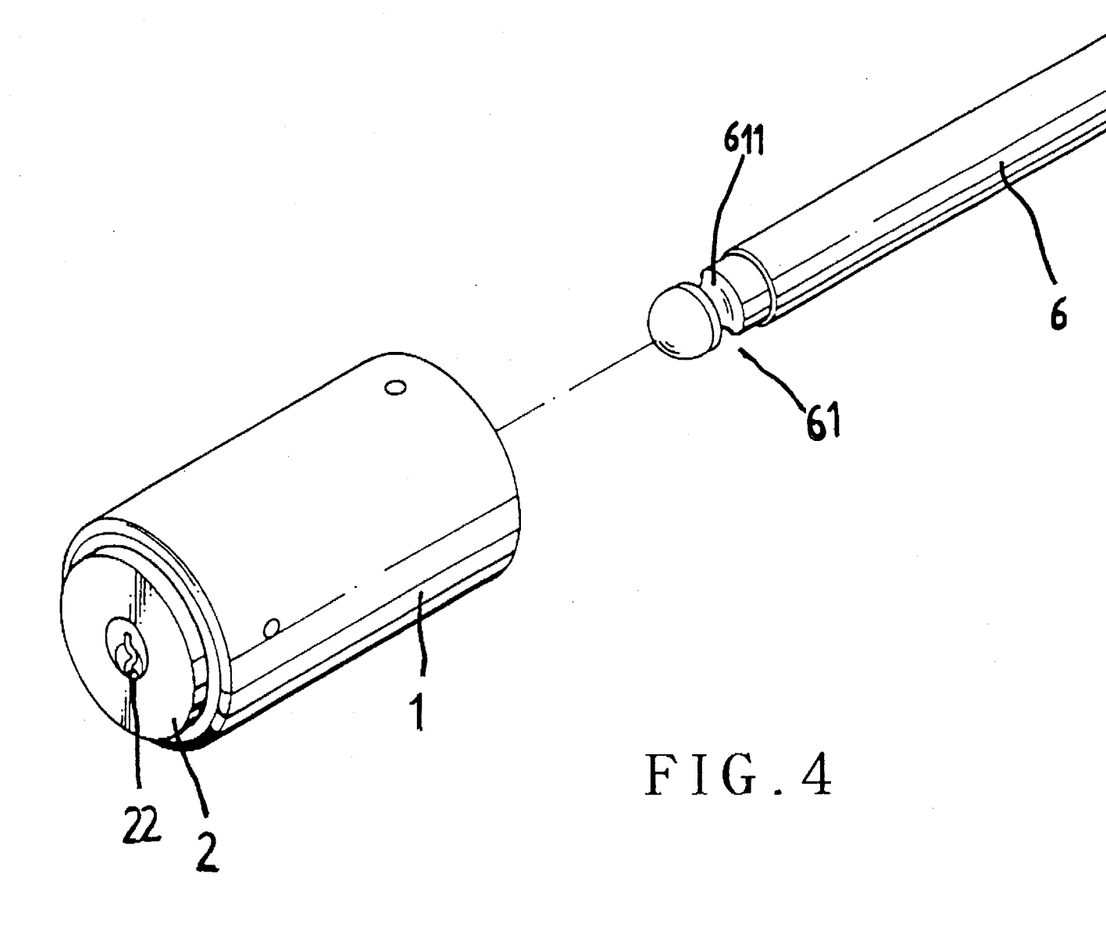
FIG. 4 is perspective diagram showing the lock assembly of the present invention.

Referring further to FIG. 3, it is a sectional view showing a key 5 being inserted into the key hole 22 of the lock body 2. When the key 5 is actuated, the projected block 21 of the lock body 2 is made to rotate at the same time. The projected block 21 inserted in the oval hole 32 of the rotary unit 3 makes the rotary unit 3 rotated as long as the key 5 is actuated. Accordingly, the relative positions of the retaining balls 33 with respect to the retaining unit 4 are changed. As the retaining balls fall into the cuts 41 defined on the front skirt 44 of the retaining unit 4, the retaining balls 33 get more room to move up and down so that a latch rod 6 having a latch head 61 provided with a peripheral groove 611, as shown in FIG. 4, can be forced into engagement with the retaining balls 33. Now, the key 5 is further rotated in such a manner that the retaining balls 33 are brought back into contact with the front skirt 44 of the retaining unit 4, rendering the retaining balls 33 caught between the front skirt 44 and the peripheral groove 611 of the lock head 61 without moving up and down so as to produce a locking state.

Figure 5:
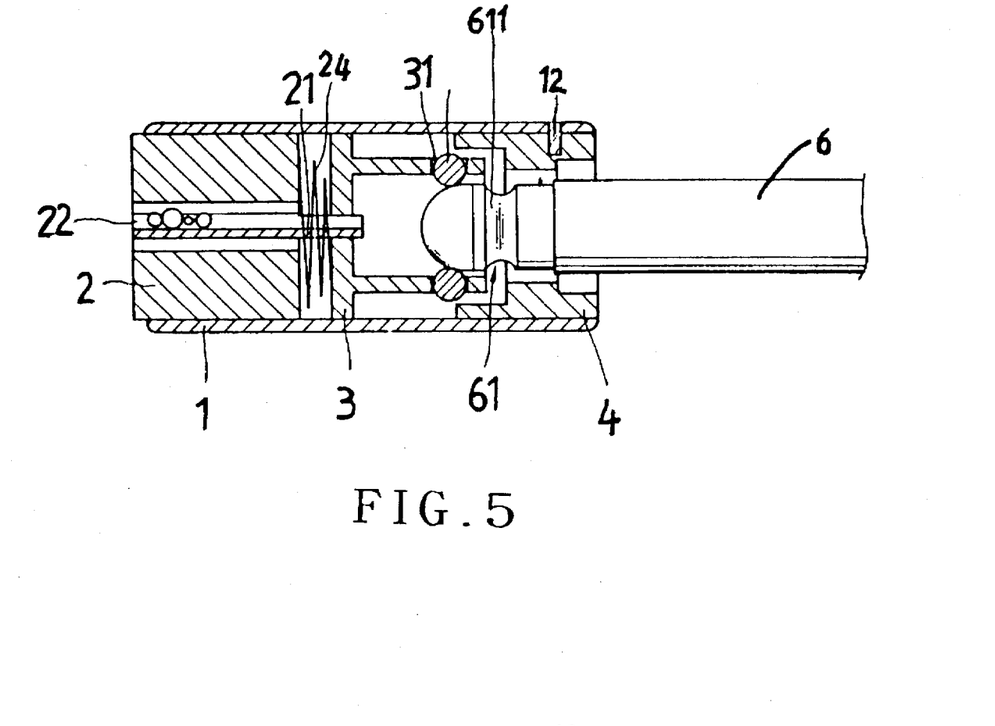
FIG. 5 is a diagram showing a latch rod being forced into the lock body, causing the spring biased rotary unit to move backwardly so as to permit the retaining balls to set free from restraint, resulting in the retaining balls coming into locking egagement with the latch head.

As shown in FIG. 5, a sectional view of the present invention shows that as no key 5 is inserted in the key hole 22, the projected block 21 does not make the rotary unit 3 rotate, so the retaining balls 33 of the rotary unit 3 are positioned within the front skirt 44 of the retaining unit 4 without moving up and down. If the latch head 61 of the latch rod 6 is forced into the lock, it will be stopped by the retaining balls 33 without further penetration. When the applied force is increased, the rotary unit 3 in abutment against the spring 24 is made to move inwardly, causing the rotary unit 3 to disengage with the retaining unit 4. Thus, the retaining balls 33 are set free of the front skirt 44 of the retaining unit 4 and are able to move up and down so that the retaining balls 33 can come into engagement with the peripheral groove 611 of the latch head 61. As long as the applied force is removed, the spring biased rotary unit 3 will bounce back and resume the engagement with the retaining unit 4. The retaining balls 33 are once more restrained by the front skirt 44 of the retaining unit 4 and the peripheral groove 611 of the latch rod 6, resulting in a locking state again.

Figure 6:
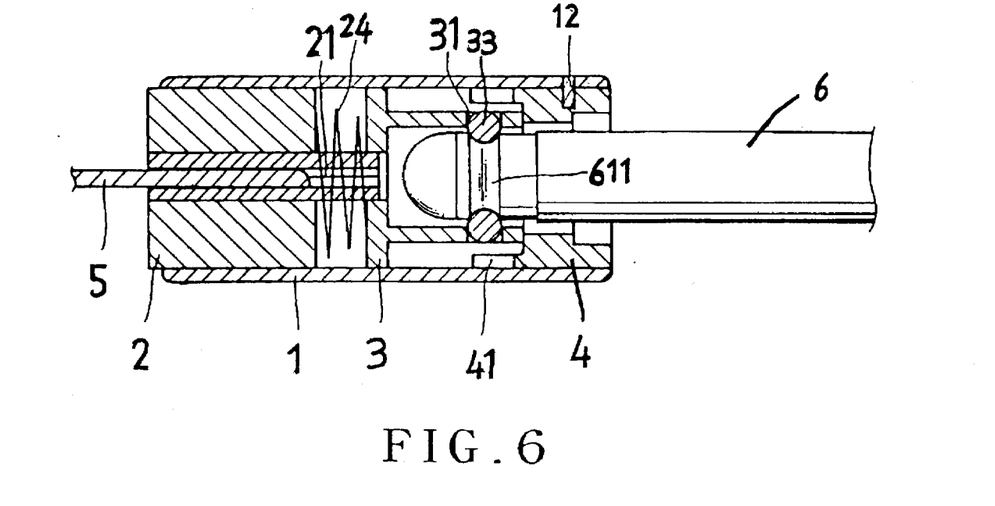
FIG. 6 is a sectional diagram showing the rotary unit being rotated by a key so as to set the retaining balls and the latch head to be separable from the lock body as it is pulled outwardly.

When the key 5 is inserted into the key hole 22 and is rotated at the same time, the projected block 21 will make the rotary unit 3 spin to such a position that the retaining balls 33 are brought into the cuts 41 of the retaining unit 4, permitting the retaining balls 33 to move freely up and down. So, as the latch rod 5 is pulled out, the latch head 61 of the latch rod 6 will drive the retaining balls 33 to move upwardly and downwardly respectively, causing the retaining balls 33 to disengage with the peripheral groove 611. Thus, the latch rod 6 and the lock can be separated.

Figure 7:
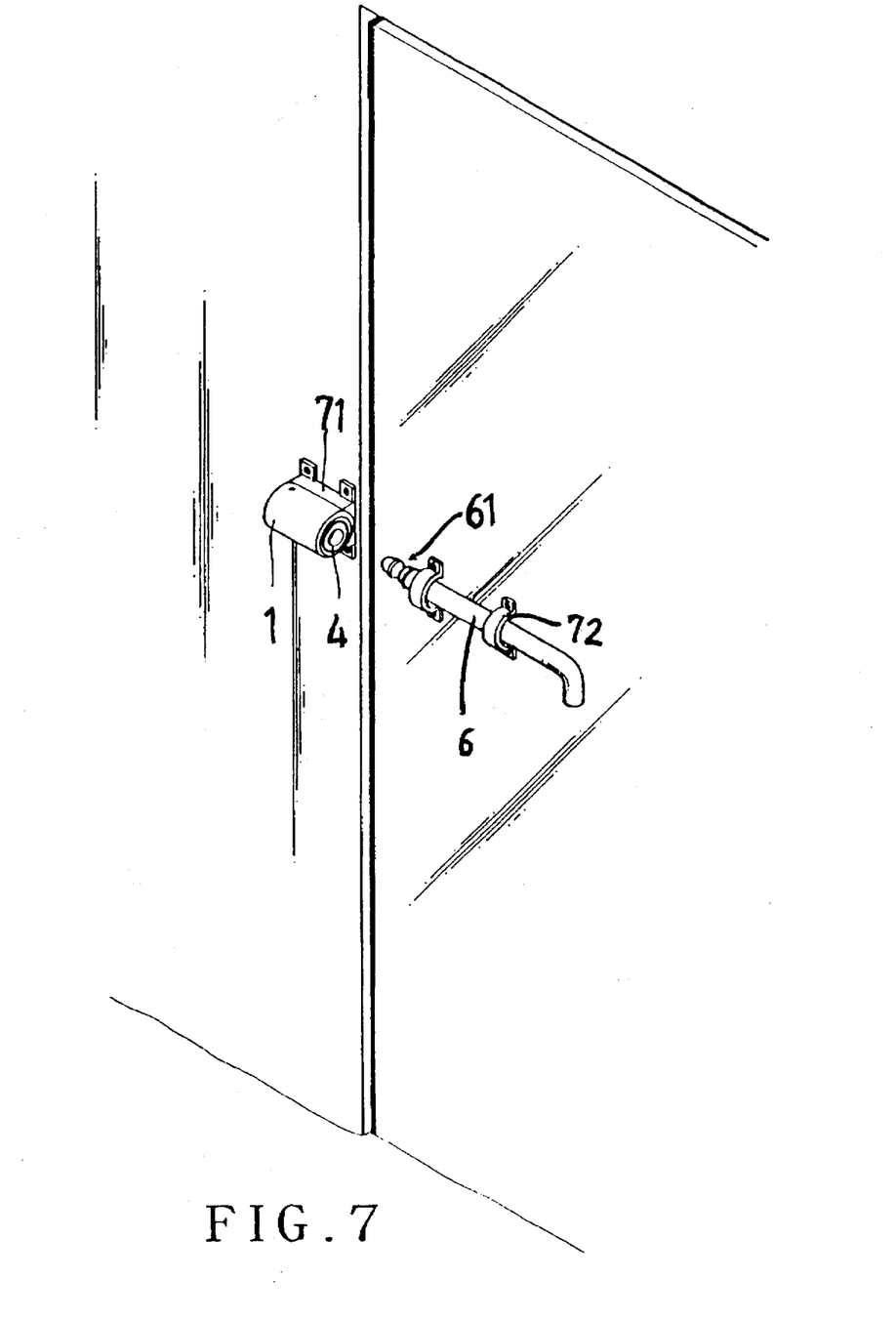
FIG. 7 is a diagram showing the installation of the lock of the present invention onto a door.

As shown in FIG. 7, the lock of the present invention can be applied to a door. The lock is mounted to a securing seat 71 and the latch rod 6 is fixed to a door by way of clamping units 72. The latch head 61 of the latch rod 6 can be slided into locking engagement with the lock to get the door locked.

Figure 8:
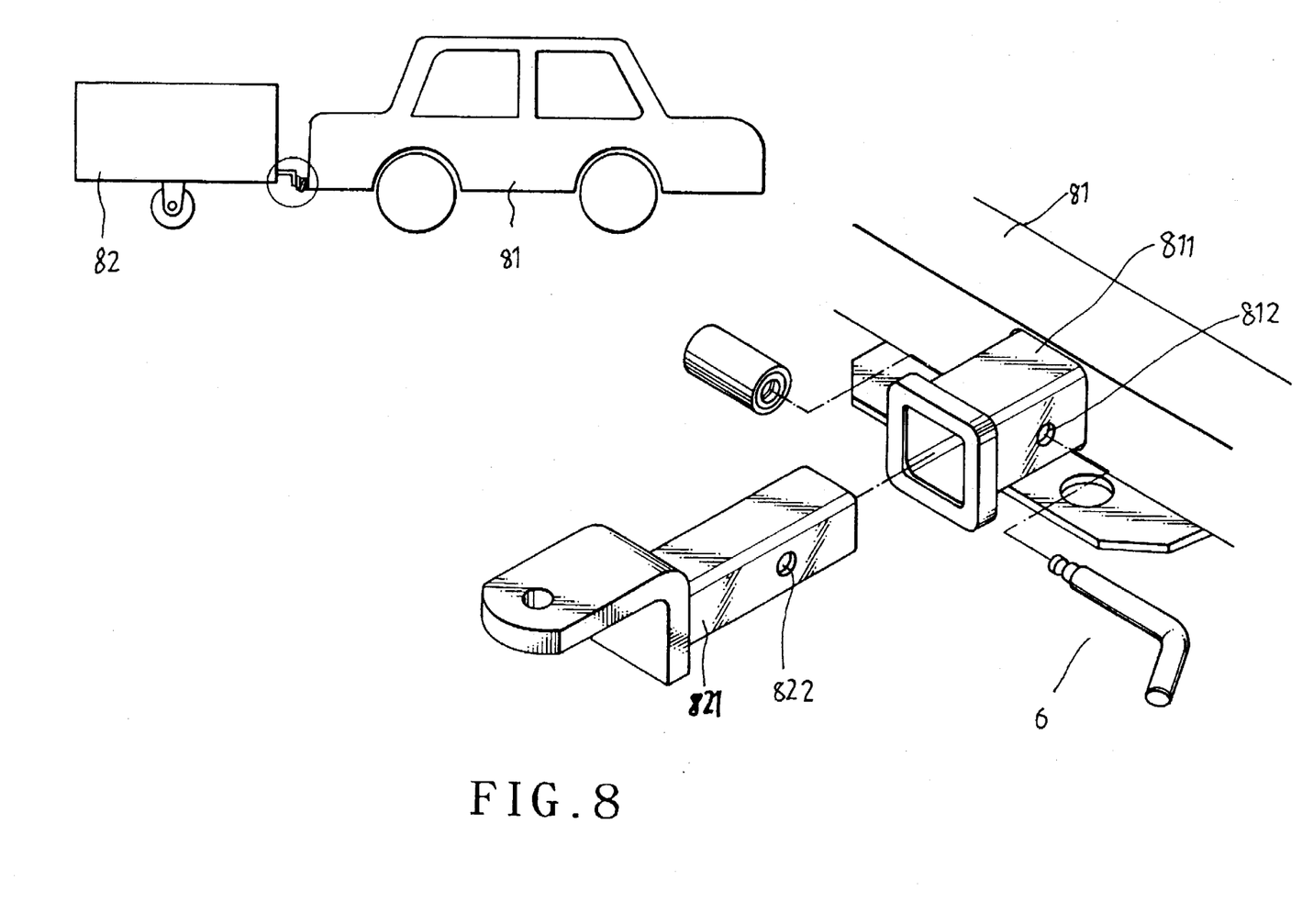
FIG. 8 is a perspective diagram showing the application of the lock of the present invention to a trailer joint means.

Referring to FIG. 8, a car 81 and a trailer 82 can be locked together by the lock of the present invention so as to protect the trailer 82 from being stolen on one's trip. The car 81 is equipped with a joint unit 811 having holes 812 disposed thereon on the bumper and the trailer 82 is provided with a pull unit 821 having holes 822 disposed thereon so that the joint unit 811 and the pull unit 821 can be engaged with each other with the holes 812, 822 placed in alignment, and the latch rod 6 is led through the holes 812, 822 and engage with the lock of the present invention.

Figures 9, 10:
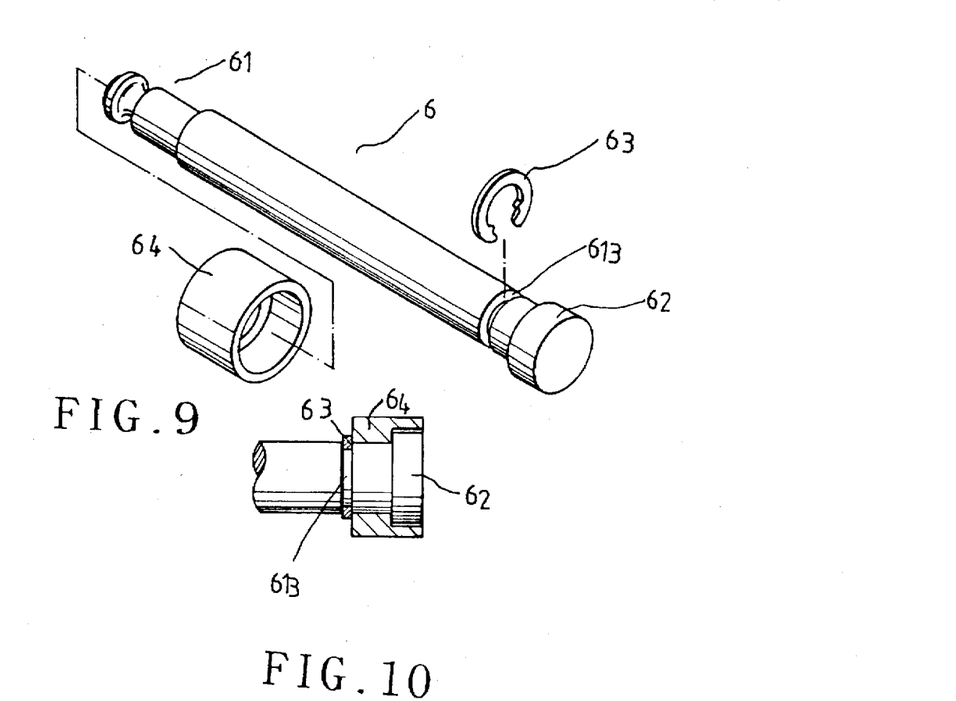
FIG. 9 is a diagram showing another embodiment of the present invention.
FIG. 10 is a sectional diagram showing the details of the embodiment shown in FIG. 9.

Referring to FIG. 9, another embodiment of the present invention is illustrated. To prevent the latch rod 6 of the present lock from being sabotaged by a saw, the bent end of the latch rod 6 is modified into a straight one provided with a flanged round block 62 having a peripheral groove 613 disposed adjacent thereto for receiving a C-shaped retaining ring 63. The retaining ring 63 is used to lock a tubular cap 64 in place which is engaged with the latch rod 6 from one end first, as shown in FIG. 10. Thus, when a burglar tries to break the latch rod 6 of the lock by a saw, the round latch rod 6 will rotate as a result of a tangent force applied thereto in cutting, i.e., no point of application of force can be located.

Figures 11, 12:
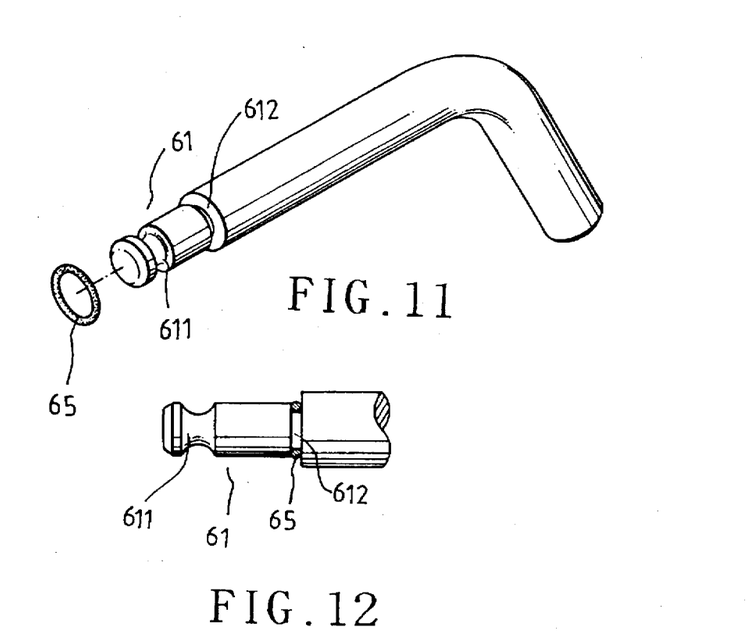
FIG. 11 is a diagram showing one further embodiment thereof.
FIG. 12 is a diagram showing the details of the embodiment of FIG. 11.

As shown in FIG. 11, to protect the lock of the present invention, disposed generally outside of a shelter, from getting rusted by rain which can come into the lock body by way of the latch head 61 of the latch rod 6, a groove 612 for receiving a sealing ring 65 is disposed at a proper position near the latch head 61.

Figure 13:
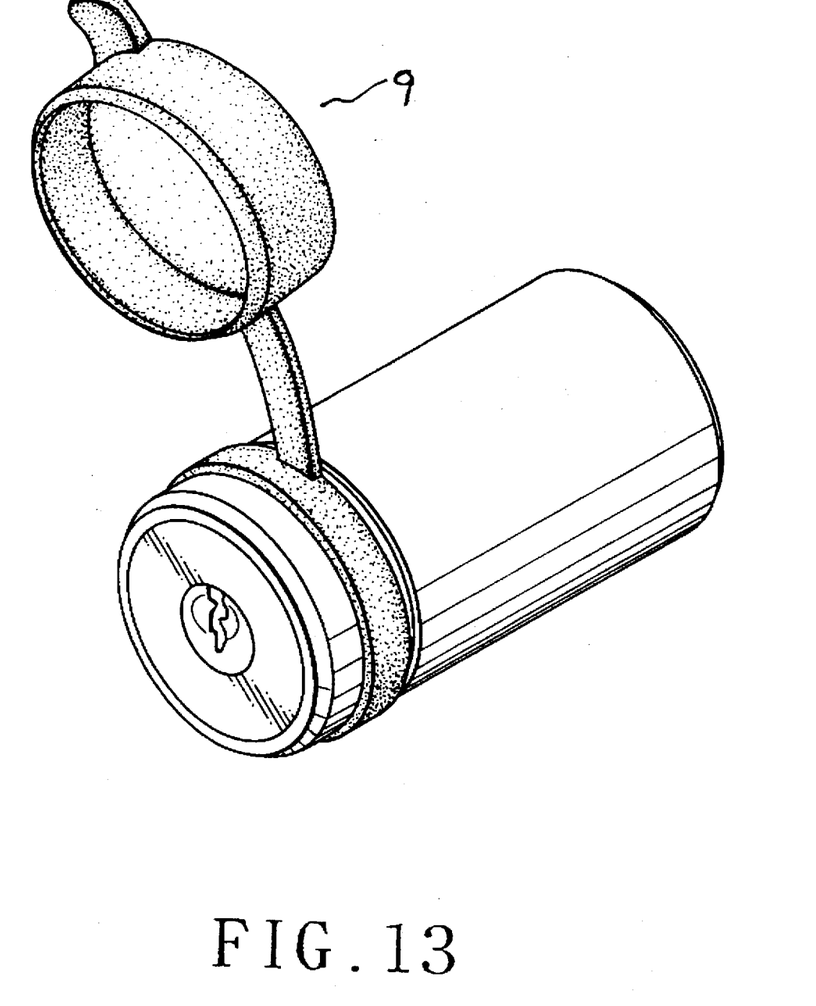
FIG. 13 is a diagram showing the lock of the present invention equipped with a pivotal cover for protection of the same.

Lastly, referring to FIG. 13, to prevent rain or other objects from entering the lock of the present invention via the key hole, a cover 9 is removably or pivotally attached to the lock of the present invention.

I claim:

1. A lock comprising:

a tubular sleeve having a number of through holes disposed thereon for receiving corresponding locking pins;

a lock body first housed in said tubular sleeve having a key hole disposed at one end and a protruded block at the other end with a spring engaged with said protruded block;

a rotary unit disposed next to said lock body having a hole at one end for receiving said protruded block of said lock body and a pair of oppositely disposed holes housing a pair of retaining balls;

a retaining unit disposed next to said rotary unit with said rotary unit partially engaged therewith having a front skirt on which a pair of oppositely disposed cuts are defined and a support plate having a through hole defined thereon;

a latch rod having a latch head disposed at one end on which a peripheral groove is defined for receiving said retaining balls upon being led into said lock via said through hole of said retaining unit and further into said rotary unit;

said retaining balls housed in said holes on said rotary unit being restrained by said front skirt of said retaining unit and only being freed to move up and down as said rotary unit is rotated to such a position that said cuts come into alignment with said retaining balls or as said rotary unit is pushed against a bias of said spring toward said lock body, causing said rotary unit as well as said retaining balls to disengage from the restraint of the front skirt of said retaining unit;

whereby said latch rod can be locked in place by said retaining balls and be unlocked as said rotary unit is rotated to make said retaining balls come into alignment with said cuts defined on said front skirt of said retaining unit.

2. The lock as claimed in claim 1 wherein said latch rod is provided with a flanged round block and a peripheral groove disposed adjacent to said round block in which a C-shaped retaining ring is placed; and a tubular cap is attached to said flanged round block and is locked in place by way of said retaining ring.

3. The lock as claimed in claim 1 wherein said latch rod is provided with a peripheral groove for receiving a sealing ring which guards against rain or water adjacent said latch head.

4. The lock as claimed in claim 1 wherein a cover is removably attached to one end of said lock having said key hole of said lock body for stopping rain or other objects from coming into said lock.

* * * * *